(12) United States Patent
Tzara

(10) Patent No.: US 8,572,503 B2
(45) Date of Patent: Oct. 29, 2013

(54) DEVICE FOR ANALYSING VARIABLE MAGNITUDES BY SIMULTANEOUS MULTIPLE WINDOWING

(76) Inventor: Wally Tzara, Le Plessis Robinson (FR)

(*) Notice: Subject to any disclaimer, the term of this patent is extended or adjusted under 35 U.S.C. 154(b) by 583 days.

(21) Appl. No.: 12/448,332

(22) PCT Filed: Dec. 20, 2007

(86) PCT No.: PCT/FR2007/002133
§ 371 (c)(1),
(2), (4) Date: Jun. 16, 2009

(87) PCT Pub. No.: WO2008/096063
PCT Pub. Date: Aug. 14, 2008

(65) Prior Publication Data
US 2010/0005415 A1    Jan. 7, 2010

(30) Foreign Application Priority Data

Dec. 29, 2006  (FR) ...................... 06 11525

(51) Int. Cl.
*G06F 3/048* (2013.01)
(52) U.S. Cl.
USPC ......................................... 715/764; 715/215
(58) Field of Classification Search
USPC ......... 715/209, 211–215, 277, 764–766, 781, 715/783; 702/68; 434/282, 430; 33/1 C; 345/440, 440.1, 440.2, 441–443; 382/113
See application file for complete search history.

(56) References Cited

U.S. PATENT DOCUMENTS

| | | | |
|---|---|---|---|
| 4,845,653 A | | 7/1989 | Conrad et al. |
| 6,473,084 B1 * | | 10/2002 | Phillips et al. ................ 345/440 |
| 6,700,575 B1 * | | 3/2004 | Bovarnick et al. ............ 345/440 |
| 6,799,127 B1 * | | 9/2004 | Sontag et al. ................... 702/68 |
| 7,062,410 B2 * | | 6/2006 | Winstead et al. .............. 702/183 |
| 7,420,563 B2 * | | 9/2008 | Wakabayashi ............. 345/440.1 |

(Continued)

FOREIGN PATENT DOCUMENTS

EP    0 740 246 A2    10/1996

OTHER PUBLICATIONS

International Search Report, dated Jul. 17, 2008, corresponding to PCT/FR2007/002133.

*Primary Examiner* — Enrique Iturralde
(74) *Attorney, Agent, or Firm* — Christie, Parker & Hale, LLP

(57) ABSTRACT

The device (D) is dedicated to the analysis of time varying quantities. It comprises a tool for managing display windows (MA) each for displaying the representation of a selected quantity and each associated with a first quantity selection tool (01) and a second time reference(s) selection tool (02) coupled to the management tool (MA). The device (D) further includes a third linking tool (03a-03c) which i) allows a user, who has selected several quantities and related time references, to select at least two of the display windows and the selected quantities, and ii) connects together the first tools (01) and/or second tools (02) of the selected display windows so that the selection of a quantity by the user using one of the first related tools (01), or master tool, of a master window results in the selection of the same quantity by the management tool (MA) at each so-called slave display window, and/ or so that the selection of a time reference by one of the second related tools (02) results in the selection of the same time reference by the management tool (MA) at each slave display window.

13 Claims, 6 Drawing Sheets

(56) References Cited

U.S. PATENT DOCUMENTS

Figure 1:
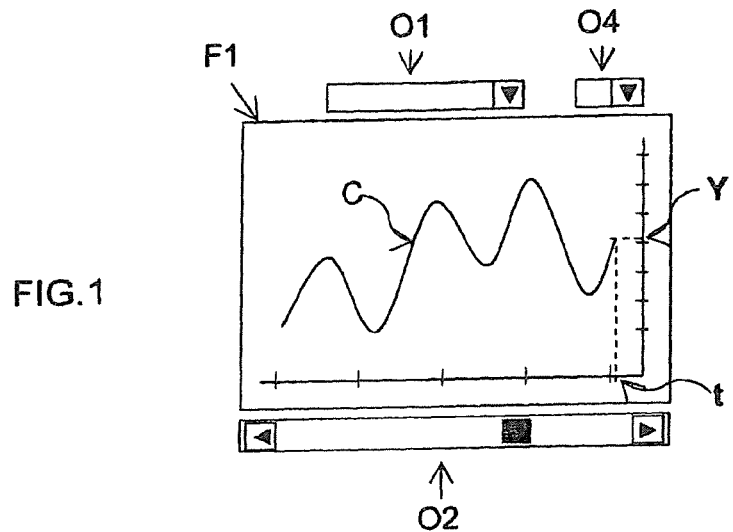

| | | | |
|---|---|---|---|
| 7,483,477 B2* | 1/2009 | Nygaard, Jr. | 375/224 |
| 7,562,310 B2* | 7/2009 | Champion et al. | 715/833 |
| 7,747,330 B2* | 6/2010 | Nolan et al. | 607/59 |
| 2002/0091548 A1* | 7/2002 | Auer et al. | 705/3 |
| 2004/0027376 A1* | 2/2004 | Calder et al. | 345/755 |
| 2004/0090472 A1* | 5/2004 | Risch et al. | 345/853 |
| 2004/0176952 A1* | 9/2004 | Fado et al. | 704/233 |
| 2005/0130329 A1* | 6/2005 | Liao et al. | 438/5 |
| 2005/0179684 A1* | 8/2005 | Wallace | 345/419 |
| 2005/0198042 A1* | 9/2005 | Davis | 707/10 |
| 2006/0031187 A1* | 2/2006 | Pyrce et al. | 707/1 |
| 2006/0123355 A1 | 6/2006 | Christiansen et al. | |
| 2007/0028142 A1* | 2/2007 | Elsner et al. | 714/25 |
| 2007/0046672 A1* | 3/2007 | Shinohara et al. | 345/440 |
| 2007/0088534 A1* | 4/2007 | MacArthur et al. | 703/17 |
| 2008/0300916 A1* | 12/2008 | Parkinson et al. | 705/2 |
| 2009/0088133 A1* | 4/2009 | Orlassino | 455/411 |
| 2010/0306782 A1* | 12/2010 | Engrand et al. | 719/312 |

* cited by examiner

DEVICE FOR ANALYSING VARIABLE MAGNITUDES BY SIMULTANEOUS MULTIPLE WINDOWING

The invention relates to analysis devices for analysing data files representing quantities that vary over time, intended to be installed in information processing equipment having at least one data processing microprocessor such as a computer, for example, possibly a portable computer.

The invention relates to any type of quantity the value of which is likely to evolve over time, such as, for example, the position of an object, the temperature or pressure (possibly atmospheric pressure) in a given location, the price of a stock, or the price of a product.

Moreover, by "analysis device" is meant here a device that can be used to display one or more identical or different representations of identical or different quantities, over selected time intervals, in graphic form on at least one screen of a computer installation, in different display windows (possibly grouped inside a common "parent window").

By "representation" is meant here the representation of the variation of a quantity over time, associated with derived graphic elements. For example, it is possible to represent the value of a parameter (such as the temperature in a location) reported every hour and a moving average of this value, or the price of a stock reported every minute and a moving average of this progress.

An analysis device of the type mentioned above generally takes the form of software (or computer) modules, but may also take the form of electronic circuits, or a combination of circuits and software. It may be installed in computer equipment, for example by remote downloading using a server or by loading from a storage medium such as an optically readable disc (CD-ROM or DVD-ROM), a magneto-optical disc or a USB key.

This type of analysis device generally comprises a management tool making it possible to define display windows each intended to display a representation of a selected quantity, and each associated with a first tool for selecting a first quantity from among several and a second tool making it possible to select at least one time reference (such as for example the ending instant and/or beginning instant of a display window), and optionally another ("fourth") tool making it possible to select one representation from among several of the quantity selected.

Each of these first, second and fourth tools takes the form for example of a menu or an input box or a moving button, or a scroll bar or button(s).

As is known to anyone skilled in the art, one of the objectives of an analysis device of the type described hereinbefore is to enable a user to collate possibly different representations of possibly different quantities and to carry out so-called "fundamental" control operations using these first and second tools, in order to display a so-called "coherent" set of windows, also known as a "coherent configuration".

By "coherent configuration" is meant here a configuration that makes it possible to achieve at least one of the two objectives mentioned below, for example with the aim of determining possible correlations and/or possible phenomena or behaviours:

comparing at least two identical representations of different quantities with one another up to the same final instant and/or starting from the same initial instant,
collating at least two different representations of the same quantity up to the same final instant and/or starting from the same initial instant.

Obtaining exactly the same final instant and/or exactly the same beginning instant on different display windows using the first and second tools associated with the latter is a tricky and time-consuming operation which requires considerable attention, on account of the need to repeat the operations for controlling these tools many times, and the imprecise nature of the control of the second tool, particularly when it takes the form of a scroll bar and/or button(s).

To allow greater understanding of the operations that have to be carried out by a user in order to achieve one of the above-mentioned objectives with an analysis device according to the prior art, an embodiment will now be described with reference to FIGS. 1 (display window) and 2 (successive configurations and operations).

In this embodiment, the user (U) has initially selected representations of four different quantities and wishes to obtain a coherent configuration related to a final instant t. The initial states of the four display windows Fi (in which the representations of these four different quantities are displayed) are designated $E_{ij}$ ($E_{11}$ ($C_{11}$, $t_1$, $Y_{11}$), $E_{21}$ ($C_{21}$, $t_2$, $Y_{21}$), $E_{31}$ ($C_{31}$, $t_3$, $Y_{31}$), and $E_{41}$ ($C_{41}$, $t_4$, $Y_{41}$), where $C_{ij}$ denotes a representation of a selected quantity in the display window Fi, tk denotes the time reference (for example the final instant) of the display window Fi, and $Y_{ij}$ denotes the value of the quantity $C_{ij}$ at the final instant tk). Moreover, a set of four states $E_{ij}$ constitutes a configuration An. The objective here is therefore to pass from the configuration A1 ($E_{11}$, $E_{21}$, $E_{31}$, $E_{41}$) to the coherent configuration A4 ($E_{12}$, $E_{22}$, $E_{31}$, $E_{42}$).

In order to do this, the user has, for example, to carry out the following control operations using the first and second tools associated with the four display windows Fi:

selection S2 and S4 of two new quantities $C_{22}$ and $C_{42}$ in the windows F2 and F4, using the first tools associated therewith. This gives a second configuration A2 ($E_{11}$ ($C_{11}$, $t_1$, $Y_{11}$), $E'_{21}$ ($C_{22}$, $t_2$, $Y_{22}$), $E_{31}$ ($C_{31}$, $t_3$, $Y_{31}$) and $E'_{41}$ ($C_{42}$, $t_4$, $Y_{42}$));

selection D1 of the time reference t in the window F1 placed in the state $E_{11}$ and associated with the quantity $C_{11}$. This gives a third configuration A3 ($E_{12}$ ($C_{11}$, t, $Y_{12}$), $E'_{21}$ ($C_{22}$, $t_2$, $Y_{22}$), $E_{31}$ ($C_{31}$, $t_3$, $Y_{31}$), and $E'_{41}$ ($C_{42}$, $t_4$, $Y_{42}$));

successive selections D2 and D4 of the time references in the windows F2 and F4, placed respectively in the states $E'_{21}$ and $E'_{41}$ and respectively associated with the quantities $C_{22}$ and $C_{42}$, until the time reference t for the window F1 is obtained. This gives the fourth coherent configuration A4 ($E_{12}$ ($C_{11}$, t, $Y_{12}$), $E_{22}$ ($C_{22}$, t, $Y_{23}$), $E_{31}$ ($C_{31}$, $t_3$, $Y_{31}$), and $E_{42}$ ($C_{42}$, t, $Y_{43}$)), this coherent configuration being designated (O) in the Figures.

The higher the number of display windows, the more the user has to carry out control operations using the first and second tools associated with these display windows so as to obtain an possible coherent configuration.

The aim of the invention is therefore to improve the situation.

To this end, it proposes a device for analysing data files (representative of values assumed by quantities that vary over time), of the type described in the introduction and comprising a third linking tool to supplement the display windows management tool, first quantity selection tools and second time reference selection tools [and optionally also fourth quantity representation selection tools], associated with the different display windows. This third linking tool enables a user who has selected a number of quantity representations and the associated time references to select at least two of the display windows of the selected quantities. This third linking tool is also tasked with linking together the first tools and/or the second tools of the selected display windows so that each time the user selects a quantity using one of the first linked tools, known as the master and associated with a master display window, this results in the selection of the same quantity by the management tool at each so-called slave display window, and/or each time the user selects a time reference using one of the second linked tools, known as the master and associated with a master display window, this results in the selection of the same time reference by the management tool at each slave display window.

The analysis device according to the invention may have other features which may be taken separately or in combination, and notably:

- its third linking tool may be tasked, when a quantity has been selected by the user by means of a master linked first tool, with causing an identical quantity to be selected by the management tool at each slave display window, as well as causing the selection by the management tool of the time reference of one of the display windows selected at each slave display window;
- alternatively, its third linking tool may be tasked, when a quantity has been selected by the user by means of a master linked first tool, with inducing an identical quantity selection by the management tool at each slave display window, as well as the use by the management tool of the last known instant of each quantity selected as time reference at each of said selected display windows;
- its third linking tool may be tasked with inducing the use of the time reference of the master display window by each slave display window;
- alternatively, its third linking tool may be tasked with inducing the use of the most recent time reference among those of the display windows selected by means of the linked second tools;
- each time reference may be selected for example from among the beginning instant of the display window and the ending instant of the display window;
- its third linking tool may be tasked, when first tools of selected display windows have been linked, with inducing the stoppage of the displaying of the linked slave first tools, the latter then being represented by the linked master first tool;
- its third linking tool may be tasked, when second tools of selected display windows have been linked, with inducing the stoppage of the displaying of the linked slave second tools, the latter then being represented by the linked master first tool;
- alternatively, its third linking tool may be tasked, when first tools and/or second tools of selected display windows have been linked, with inducing the change in the appearance of each display window selected and/or the change in the appearance of each linked first tool and/or each linked second tool;
- as another alternative, its third linking tool may be tasked, when first tools and/or second tools of selected display windows have been linked, with inducing the change in the appearance of the slave display windows and/or the change in the appearance and temporary inactivation of each linked slave first tool and/or each linked slave second tool;
- its third linking tool may be tasked, in the event of deselection of the master and slave display windows, with cessation of the corresponding linking between the first tools and/or between the second tools;
  - its third linking tool may be tasked, after the breaking of the corresponding links between linked first tools and/ or between linked second tools, with inducing the restoration of the time reference which was selected before the establishment of the link of each quantity at each of the second tools previously linked;
  - alternatively, its third linking tool may be tasked, after the breaking of the corresponding links between linked first tools and/or between linked second tools, with inducing the selection of the last known time reference for each quantity at each of the second tools previously linked.

The invention also proposes a storage medium intended to be connected to computer equipment and storing an analysis device of the type described hereinbefore and arranged in the form of program(s).

Figure 3:
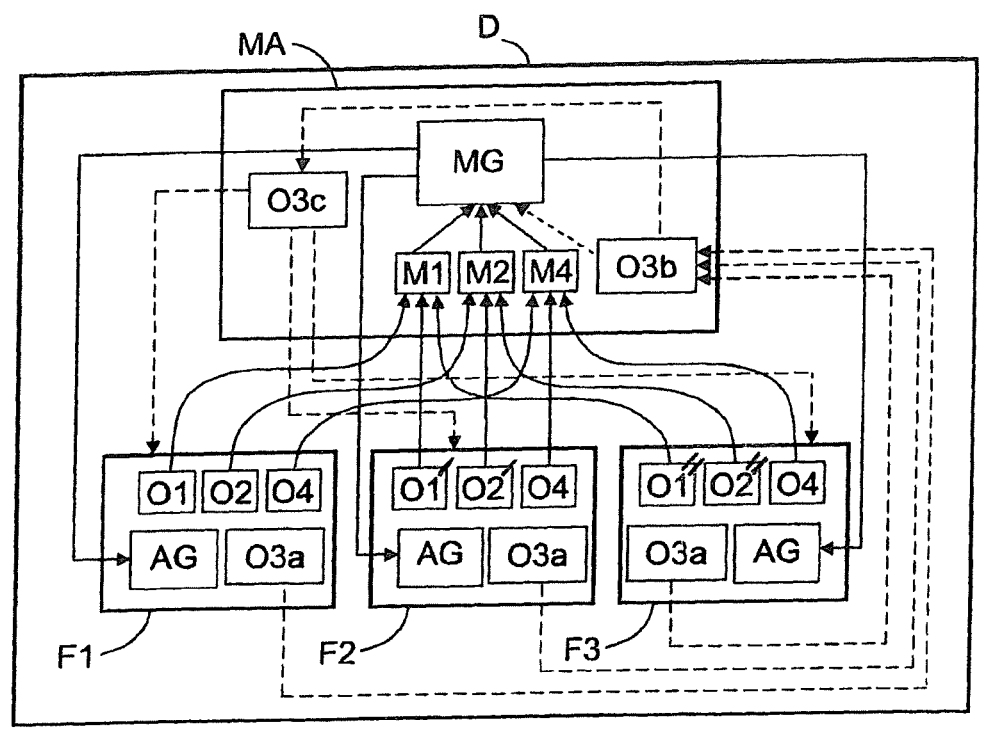
Figure 2:
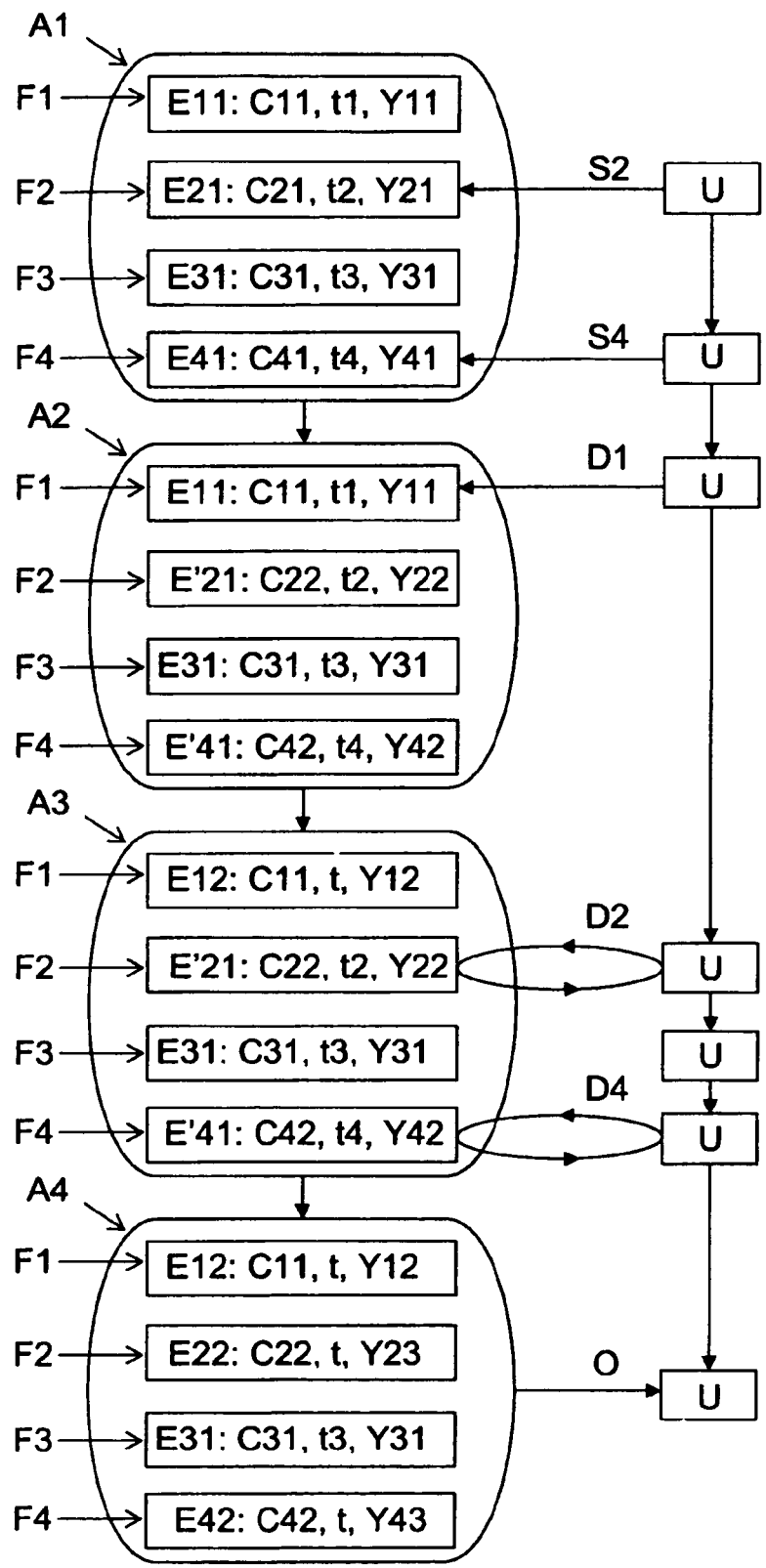
Figure 4:
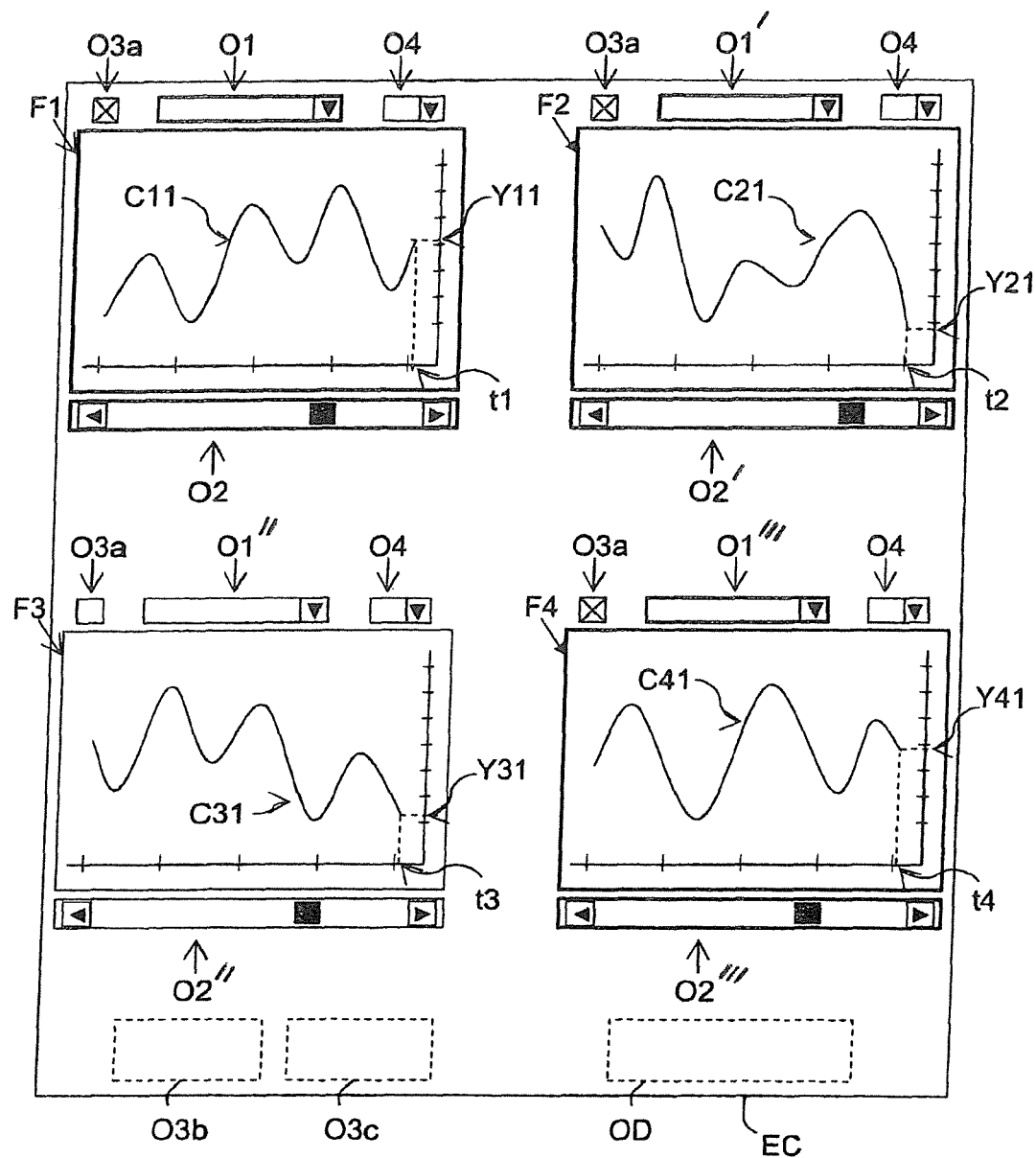
Figure 5:
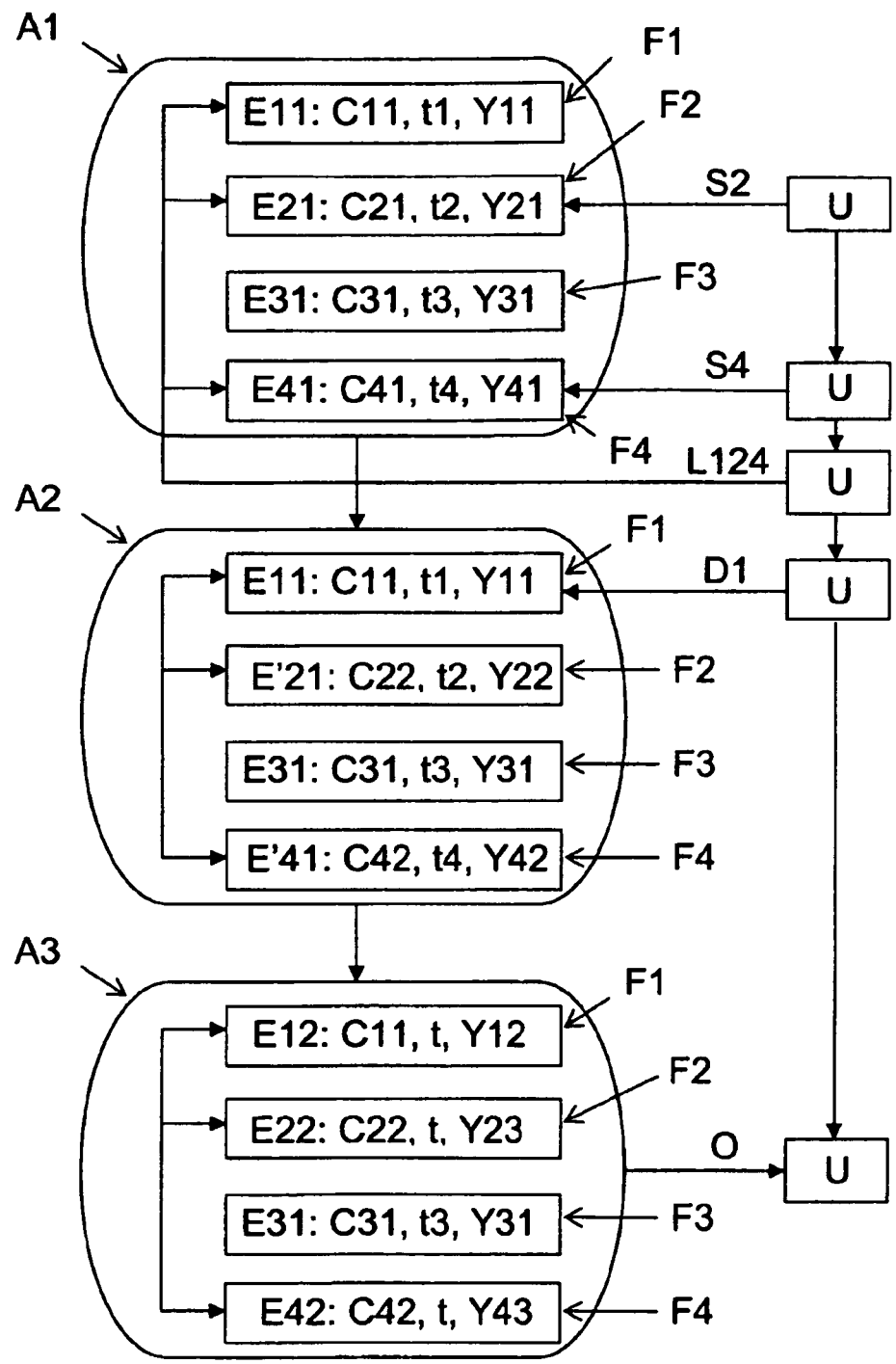
Figure 6:
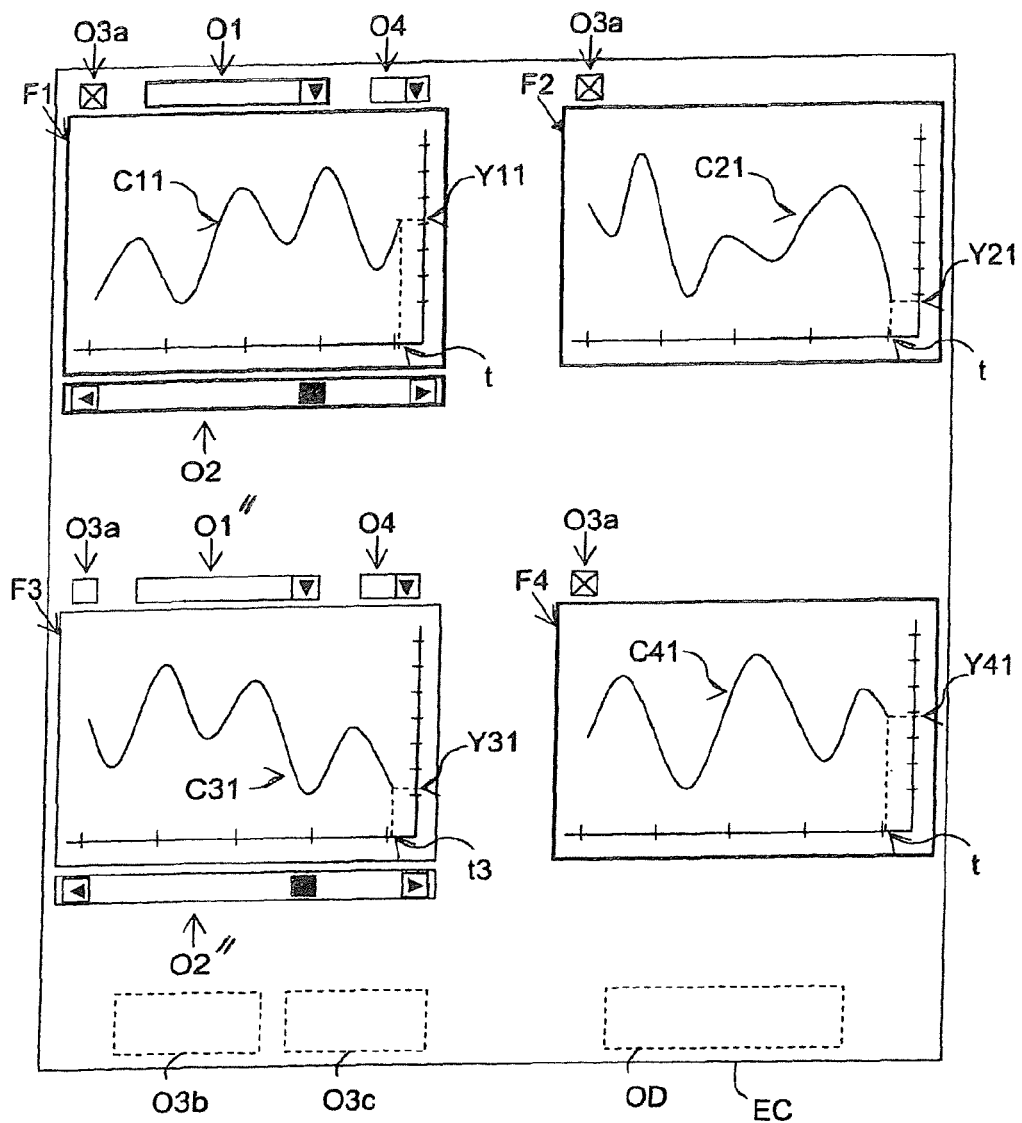
Figure 7:
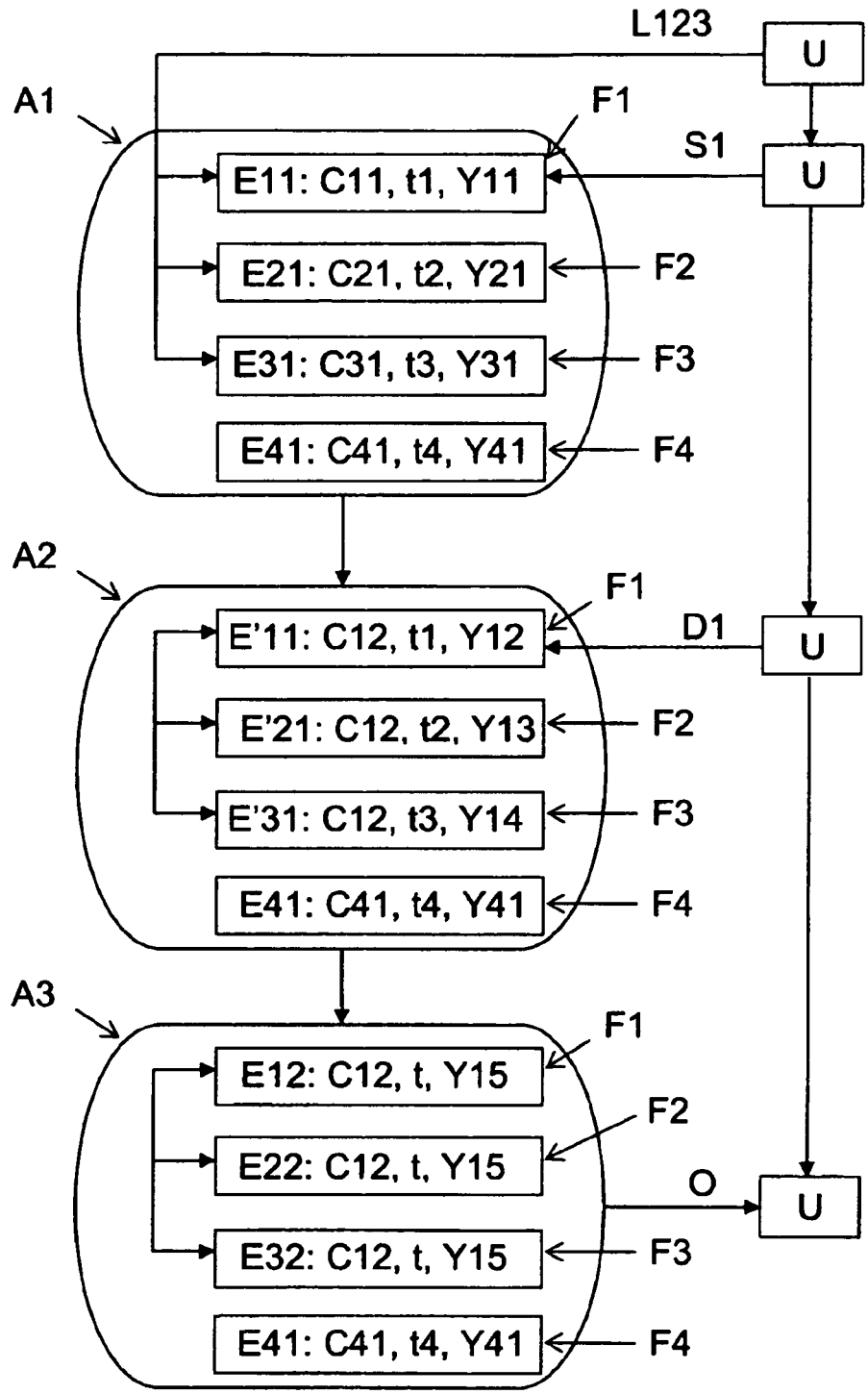

Further features and advantages of the invention will become apparent from a study of the detailed description that follows, and the attached drawings, wherein:

FIG. 1 shows in highly schematic form an example of a display window and the first, second and fourth associated tools, generated by an analysis device according to the prior art, FIG. 2 shows in highly schematic form an example of successive configurations and series of operations required in order to obtain a coherent configuration in the case of an analysis device according to the prior art, FIG. 3 shows in a highly schematic and functional form an embodiment of an analysis device according to the invention, FIG. 4 shows in highly schematic form a first example of the displaying on a screen (EC) of four display windows by means of an analysis device according to the invention, three of these display windows (F1, F2 and F4) being linked, FIG. 5 shows in highly schematic form a first example of successive configurations and series of operations required in order to obtain a coherent configuration in the case of an analysis device according to the invention, FIG. 6 shows in highly schematic form a second example of the displaying of four display windows on a screen (EC) by means of an analysis device according to the invention, three of these display windows (F1, F2, and F4) being linked, FIG. 7 shows in highly schematic form a second example of successive configurations and series of operations required in order to obtain a coherent configuration in the case of an analysis device according to the invention.

The attached drawings may serve not only to complement the invention but also to help define it, as necessary.

The invention sets out to make it easier for a user to obtain a coherent configuration of display windows by means of a device for analysing data files representative of quantities that may vary over time.

In what follows, we will consider as a non-limiting example that the quantities to be displayed are stock prices. However, the invention relates to any type of quantity the value of which is liable to change over time, and in particular the position of an object, or the temperature or pressure (possibly atmospheric pressure) in a given place, or the price of a product.

Reference will be made first of all to FIG. 3 to show an embodiment of an analysis device D according to the invention by way of example.

As indicated in the introductory part, the analysis device D is intended to allow one or more identical or different representations of identical or different quantities $C_{ij}$ to be displayed in graphic form, over identical or different selected time intervals, on at least one screen (EC) of a computer installation, in different display windows (Fi) (at least two ($i \geq 2$), possibly grouped inside a common "parent window").

In the embodiment illustrated only three windows F1 to F3 are shown, but the device D is intended to manage at least two of them.

This type of device D is intended to be installed in a computer installation having at least one data processing microprocessor, at least one display screen (EC), storage media and a man/machine interface (keyboard, mouse and the like). This computer installation may be for example a (micro)computer which is optionally portable (or mobile).

This analysis device D is preferably made in the form of software (or computer) modules. However, it may also take the form of electronic circuits or a combination of circuits and software, such as for example a specialised video card with several outputs.

When it is in the form of software modules, it may for example be installed in the computer equipment by remote downloading via a server, or by loading from a storage medium such as an optically readable disc (CD-ROM or DVD-ROM), a magneto-optical disc or a USB key, on which it is stored.

The analysis device D comprises first of all a tool MA for managing display windows Fi. This management tool MA is tasked with defining display windows Fi each of which is intended to display the representation of a quantity Cij selected by the user of the computer equipment in which it is installed, by means of the man/machine interface. It is important to note that the representation of a quantity Cij may optionally also be selected from among several by the user by means of the man/machine interface of the computer equipment.

The representation may be, for example, in the case of a quantity such as the price of a stock, the progress reported every 30 minutes accompanied by a set of two moving average of different lengths or a weighted mean.

The management tool MA is also tasked with assigning to each display window Fi a first tool O1 enabling the user to select one quantity Cij from among many, and a second tool O2 enabling the user to select at least one time reference tk (such as for example the end (or final) instant or the starting (or initial) instant of a display window Fi), and optionally (as shown) a fourth tool O4 enabling the user to select the representation of one quantity Cij from among many.

As schematically shown in FIG. 4, each of the first tools O1, second tools O2 and fourth tools O4 take the form, when displayed on a screen (EC), of a menu or a textbox or a moving button, and/or a scroll bar or scroll button, for example.

More precisely, in the non-restrictive example shown in FIG. 4, each first tool O1 associated with a display window Fi is in the form of a rolling inputting field, each second tool O2 associated with a display window Fi is in the form of a rolling inputting field and each fourth tool O4 associated with a display window Fi is in the form of a scroll bar.

As shown in FIG. 1, the management tool MA comprises for example a management module MG and management sub-modules M1, M2 and M4. The management sub-modules M1, M2 and M4 receive display instructions from the first, second and fourth tools O1, O2 and O4, respectively, which are associated with the different display windows Fi used. These instructions are representative of the selections made by this user for each display window Fi that he uses and that is displayed on one or more screens EC.

The management sub-modules M1, M2 and M4 generate requests intended for the management modules MG from the instructions received. The management module MG generates quantity graphs intended to be displayed in the display windows Fi used by the user, from the requests emanating from the management sub-modules M1, M2 and M4.

Each display window Fi is defined by a (graphic) display tool AG which receives the graph generated for its display window Fi by the management module MG.

According to the invention, the analysis device D also comprises a third tool O3 known as the linking tool. This latter enables the user who has already selected a number of quantities Cij and the associated time references tk and, optionally, the associated representations, to select at least two of the display windows Fi of these selected quantities Cij, in order to link the first tools O1 associated therewith to one another and/or to link the second tools O2 associated therewith to one another.

It will be noted that the reference O3 does not appear in the Figures. It is only a reference used in the text to denote various elements (or parts) that cooperate together as regards linking and are hereinafter designated O3a, O3b and O3c.

This linking between tools O1 and/or O2 are intended to force them to select the same quantity (O1) or the same time reference tk simultaneously. More precisely, when the user selects a quantity Cij by means of one of the first tools O1 linked by means of the third tool O3, i.e. said master first tool associated with a master display window, the third tool O3 sends instructions to the management tool MA and more precisely to its management module MG, so that it simultaneously uses the same quantity Cij at each so-called slave display window.

The third tool O3 may also, and possible at the same time, send instructions to the management tool MA and more precisely to its management module MG, so that it simultaneously uses the time reference tk of one of the selected display windows Fi in each of said selected display windows.

It is important to note that there are circumstances in which the time references cannot be the same in different windows. For example the Nasdaq 100 and Cac 40 indices can only be displayed synchronously in French time between 1530 h and 1730 h. More generally, displayed time references are only synchronous when the associated quantities are defined at the same instant. Therefore, time synchronisation (common time reference tk) can only be done when it is possible. When synchronisation is not possible, one (or more) representation(s) remain on hold until synchronisation is possible again.

Moreover, when the user selects a time reference (final instant or initial instant) tk by means of one of the second tools O2 linked by means of the third tool O3, i.e. said master second tool associated with a master display window, the third tool O3 sends instructions to the management tool MA, and more precisely to its management module MG, so that it simultaneously uses this same time reference tk at each of the selected display windows Fi and hence at each of said slave windows.

It will be noted that the time reference tk which is used in common in each of the linked windows may for example be the one used in the linked display window which is the master when the user has selected it. When windows/tools have been linked, but before any control operation, the device D may force each window to use the last known time reference (for example the present instant) relative to the quantity already present in this window.

It should also be noted that the master window may be required to be the one that has the lowest value for the index i of the linked windows. However, this is not obligatory. It is possible in fact to envisage an embodiment in which the master window is the one that is the object of the first selection operation after being linked, or the one chosen for this purpose by the user (in this case, additional selection means must be provided to enable the user to choose the master window).

As schematically shown in FIG. 3, the third tool O3 comprises, for example, firstly, first parts O3*a* which are associated respectively with the display windows Fi to enable the user to select at least some of them with a view to linking them to one another and, secondly, a second part O3*b* tasked with making the link between the first tools O1 and/or between the second tools O2 of the display windows Fi selected by means of the first parts O3*a*. As shown, the second part O3*b* of the third tool O3 may for example be part of the management tool MA.

As shown schematically in FIG. 4, each of the first parts O3*a* of the third tool O3 may for example take the form of a tick box as displayed on an EC screen. In this case, when the user clicks on a tick box O3*a*, using the mouse of the man/machine interface, the associated display window Fi is immediately selected. This is made evident for example by the appearance of a cross in the tick box O3*a*. However, any other means of selecting a display window Fi may be envisaged, particularly a control button (on which the user may click for example to activate or deactivate a link). It is also possible to envisage that clicking within a display window Fi causes it to be selected (for example windows can be selected by holding down the "Ctrl" key on the keyboard while clicking successively on each of the windows that are to be selected (and hence linked)).

The second part O3*b* receives linking instructions coming respectively from the first parts O3*a* associated with the windows Fi used at a given instant by the user. These instructions are representative of the linking selections carried out by this user for each display window Fi that he uses and which is displayed on one or more screens EC. The second part O3*b* generates link requests intended for the management module MG from the instructions received. The management module MG then generates the quantity graphs intended to be displayed in the display windows Fi used by the user, from the requests emanating from the management sub-modules M1, M2 and M4, taking account of the requests emanating from the second part O3*b*.

It will be noted that the third tool O3 may for example comprise a third part O3*c*, coupled to its second part O3*b* and arranged, when first tools O1 and/or second tools O2 of selected display windows Fi have been linked, so as to trigger the change in the appearance of each display window Fi selected and/or the change in the appearance of each linked first tool O1 and/or each linked second tool O2. This is the case in the non-restrictive example shown in FIG. 4. More precisely, in this example, the frame of each display window selected (in this case F1, F2 and F4), of each linked first tool O1 and of each linked second tool O2 is in bold, to differentiate the selected display windows more clearly from those that have not been selected (in this case F3).

The changes in appearance of the slave windows are requested by the third part O3*c* of the third tool O3 from the display tools AG and from the first tools O1, second tools O2 and fourth tools O4 associated with the different windows used.

In an alternative (not shown), the third linking tool O3 (and more precisely its third part O3*c*) may be arranged, for example, when first tools O1 and/or second tools O2 of selected display windows Fi have been linked, so as to trigger the change in the appearance of each selected display window Fi and/or the change in the appearance of each slave first tool O1 and/or each slave second tool O2, as well as the temporary inactivation of each slave first tool O1 and/or each slave second tool O2.

By "slave tool" is meant here a tool that is forced simultaneously to use a selection identical to that made by the user with the homologous master tool. For example, if the user has linked the windows F1, F2 and F4 by means of the associated first parts O3*a* of the third tool O3 and is using the first tool O1 of the first window F1 to select a quantity C1*j*, then the window F1 is the master window and the first tool O1 associated with this window F1 is the master first tool. Consequently, the other two windows F2 and F4 are slave windows and their first tools O1', O1''' are slave first tools forced to follow simultaneously the selection made by the user by means of the master first tool of the master window F1.

Moreover, the term "temporary inactivation" here means the fact of temporarily rendering a first O1', O1''' or second O2', O2''' slave tool inactive so that the user cannot use it to make a selection (only the linked master first O1 or second O2 tool can then be used to make a selection which is followed in identical manner by each linked slave first tool O1', O1''' or second tool O2', O2''').

The temporary inactivation of each slave first tool O1', O1''' and/or of each slave second tool O2', O2''' may be managed for example by the third part O3*c* of the third tool O3.

In another variant illustrated in FIG. 6, the third linking tool O3 (and more precisely the third part O3*c* thereof) may be arranged for example, when first tools O1 and/or second tools O2 of selected display windows Fi have been linked, so as to trigger the stoppage of the displaying of the linked slave first tools O1', O1''' and/or linked slave second tools O2', O2'''. In this case, only the master first tool O1 and/or the master second tool O2 continue(s) to be displayed and available for use by the user. The slave first tools O1', O1''' and/or second tools O2', O2''' are then respectively represented by the master first tools O1 and/or second tools O2.

In the non-restrictive example shown in FIG. 6, the frame of each selected display window (in this case F1, F2 and F4) is in bold lines to differentiate more clearly from the unselected display windows (in this case F3), and only the master first tools O1 and second tools O2 of the first master window F1 are displayed (the slave first tools O1', O1''' and second tools O2', O2''' of the slave windows F2 and F4 have been cancelled on the orders of the third part O3*c* of the third tool O3.

When the user decides to deselect all or some of the linked windows, for example by clicking once more on the first parts O3*a* of these windows, the third tool O3 (and more specifically its second part O3*b*) breaks (removes) the corresponding links between first tools O1 and/or second tools O2. In the absence of a tick box, the deselection of the linked windows may be carried out by holding down the "Ctrl" key on the keyboard while clicking successively on each of said windows to be deselected. Once the deselection has been carried out, the third tool O3 (and more precisely its second part O3*b*) may for example leave the first tools O1 and/or the second tools O2 previously linked in their current state, or it may leave the first tools O1 previously linked in their current state and restore, at each of the previously linked second tools O2, the time reference at the last known instances relative to each quantity. Moreover, if the displaying of the slave first tools O1', O1''' and/or second tools O2', O2''' is stopped, the third tool O3 (and more precisely its third part O3*c*) causes them to be displayed again in association with their respective windows Fi. When windows are no longer linked they are once again independent of one another. A first example of the use of the analysis device D according to the invention will now be described with reference to FIG. 5.

In this first example, illustrating the first objective mentioned in the introductory part, the user (U) has initially selected representations of four different quantities and wishes to obtain a coherent configuration (O) relating to a final instant (time reference) t. The initial states of the four display windows Fi (in which the representations of the four different quantities are displayed) are designated Eij (E11 (C11, t1, Y11), E21 (C21, t2, Y21), E31 (C31, t3, Y31), and E41 (C41, t4, Y41), where Cij denotes a representation of a selected quantity in the display window Fi, tk denotes the time reference (for example the final instant) of the display window Fi, and Yij denotes the value of the quantity Cij at the final instant tk). The objective here is therefore to pass from the configuration A1 (E11, E21, E31, E41) to a coherent configuration (O).

In order to do this, the user (U) has to carry out the following control operations, for example, using the first tools O1 and second tools O2 associated with the four display windows Fi:

selection S2 and S4 of two new quantities C22 and C42 in the windows F2 and F4, using the first tools O1', 01' associated therewith. Then linking (L124) of the windows F1, F2 and F4. This gives a second configuration A2 (E11 (C11, t1, Y11), E'21 (C22, t2, Y22), E31 (C31, t3, Y31) and E'41 (C42, t4, Y42));

selection D1 of a time reference (final instant) t in the window F1 placed in the state E11 and associated with the quantity C11. The windows F1, F2 and F4 being linked, this selection D1 causes the simultaneous selection of the same time reference (final instant) t at the second tools O2', O2''' associated with the windows F2 and F4. This gives a third, coherent, configuration A3 (E12 (C11, t, Y12), E22 (C22, t, Y23), E31 (C31, t3, Y31), and E42 (C42, t, Y43)), designated (O).

As can be seen by comparing the series of operations illustrated in FIGS. 2 (prior art) and 5 (invention), which result in the same coherent configuration (O) starting from the same initial configuration A1, the invention makes it possible to eliminate the successive operations D2 and D4 of selecting the time reference t at the windows F2 and F4.

A second example of the use of the analysis device D according to the invention will now be described with reference to FIG. 7.

In this second example illustrating the second objective mentioned in the introductory part, the user has also initially selected representations of four different quantities and wishes to obtain a coherent configuration (O) relating to a final instant t. The initial states of the four display windows Fi are identical to those of the first example described hereinbefore. (A1 (E11 (C11, t1, Y11), E21 (C21, t2, Y21), E31 (C31, t3, Y31), and E41 (C41, t4, Y41)).

The user carries out the following control operations, for example, using the first tools O1 and second tools O2 associated with the four display Windows Fi:

linking (L123) the windows F1, F2 and F3. Then selecting S1 a new quantity C12 in the window F1, using the first tool O1 associated therewith. As the windows F1, F2 and F3 are linked, this selection S1 results in the simultaneous selection of the same quantity C12 at the first tools O1', 01" associated with the windows F2 and F3. This gives a second configuration A2 (E'11 (C12, t1, Y12), E'21 (C12, t2, Y13), E'31 (C12, t3, Y14), and E41 (C41, t4, Y41));

selecting D1 a time reference (final instant) t in the window F1 placed in the state E'11 and associated with the quantity C12. The windows F1, F2 and F3 being linked, this selection D1 causes the simultaneous selection of the same time reference (final instant) t at the second tools O2', O2" associated with the windows F2 and F3. This gives a third, coherent, configuration A3 (E12 (C12, t, Y15), E22 (C12, t, Y15), E32 (C12, t, Y15), and E41 (C41, t4, Y41)), designated (O). As all three states E12, E22 and E32 correspond to representations which are a priori different from a first quantity, they also correspond to the same final value Y15 of the quantity C12 as they have the same common final instant t.

It will be noted that the selection operation D1 may be carried out on any of the windows F1, F2 or F3. Moreover, the selection operations S1 and D1 may be carried out in any order.

The invention is not limited to the embodiments of the analysis device and storage medium described hereinbefore, purely by way of example, but encompasses all the alternatives that may be envisaged by the skilled man within the scope of the claims that follow.

The invention claimed is:

1. A non-transitory computer readable medium embodying program instructions for execution by a data processing apparatus, the program instructions adapting the data processing apparatus for analysing data files representative of values assumed by quantities that vary over time, said program instructions comprising:

managing a plurality of display windows via a display window management tool, each display window for displaying a representation of a selected quantity and, being associated with a first quantity selecting tool and a second time reference selecting tool, coupled to said management tool, each display window further comprising a third linking tool arranged so as to enable a user who has selected a number of quantities and associated time references, to select at least two of the plurality of display windows associated with the selected quantities, and link together the first tools and the second tools of the selected display windows, so that the selection of a particular quantity by the user using a master linked first tool selected from the linked first tools and associated with a master display window chosen from the selected display windows results in an automatic selection of the particular quantity by said management tool on each slave display window chosen from the selected display windows, for displaying a representation of the particular quantity in all the selected display windows without affecting the representation of the quantity displayed in one or more of the plurality of windows not selected by the user, and a selection of a particular time reference by the user using a master linked second tool selected from the linked second tools and associated with the master display window results in an automatic selection of the particular time reference by said management tool on each slave display window for using the particular time reference in all the selected display windows without affecting the time reference used in one or more of the plurality of windows not selected by the user.

2. The computer readable-medium according to claim 1, characterised in that said third linking tool is arranged so that the selection of the particular quantity by the user via the master linked first tool results in selection of the particular quantity by said management tool on each slave display window, as well as selection by said management tool of a time reference of one of the selected display windows on each slave display window.

3. The computer readable-medium according to claim 1, characterised in that said third linking tool is arranged so that the selection of the particular quantity by the user via the master linked first tool results in selection of the particular quantity by said management tool on each slave display window, as well as use by said management tool of a last known instant of the particular quantity as a time reference on each of said selected display windows.

4. The computer readable-medium according to claim 1, characterised in that said third linking tool is arranged so as to result in use of a time reference of the master display window by each slave display window.

5. The computer readable-medium according to claim 1, characterised in that said third linking tool is arranged so as to result in use of a most recent time reference among time references of the display windows selected via the linked second tools.

6. The computer readable-medium according to claim 1, characterised in that each time reference is selected from a group consisting of a beginning instant of the corresponding display window and an ending instant of the corresponding display window.

7. The computer readable-medium according to claim 1, characterised in that said third linking tool is arranged, in response to the linking of the first tools of the selected display windows, so as to induce suppression of display of slave linked first tools selected from the linked first tools and associated with the slave display windows, the slave linked first tools being represented by the master linked first tool.

8. The computer readable-medium according to claim 1, characterised in that said third linking tool is arranged, in response to the linking of the second tools of the selected display windows, so as to induce the suppression of display of slave linked second tools selected from the linked second tools and associated with the slave display windows, the slave linked second tools being represented by the master linked second tool.

9. The computer readable-medium according to claim 1, characterised in that said third linking tool is arranged, in response to the linking of the first tools, the second tools, or both the first tools and the second tools of the selected display windows, so as to induce a change in appearance of each of the selected display windows, or a change in appearance of each linked first tool, each linked second tool, or any combination of change in the appearance of the latter three.

10. The computer readable-medium according to claim 1, characterised in that said third linking tool is arranged, in response to the linking of the first tools, second tools, or both the first tools and the second tools of the selected display windows, so as to induce a change in appearance of the slave display windows, or a change in said appearance and temporary inactivation of each slave linked first tool selected from the linked first tools and associated with the slave display windows, or each slave linked second tool selected from the linked second tools and associated with a corresponding slave display window, or any combination of change in said appearance or temporary inactivation of the latter three.

11. The computer readable-medium according to claim 1, characterised in that said third linking tool is arranged, in response to deselection of said master and slave display windows, so as to cease the corresponding linking between the linked first tools, between the linked second tools, or between the linked first tools and between the linked second tools.

12. The computer readable-medium according to claim 11, characterised in that said third linking tool is arranged, after the cessation of the corresponding linking between the linked first tools, between the linked second tools, or between the linked first tools and between the linked second tools, so as to induce restoration of a time reference which was selected before establishment of the linking of each quantity on each of the second tools previously linked.

13. The computer readable-medium according to claim 11, characterised in that said third linking tool is arranged, after the cessation of the corresponding linking between the linked first tools, between the linked second tools, or between the linked first tools and between the linked second tools, so as to induce selection of a last known time reference for each quantity on each of the second tools previously linked.

* * * * *